US006824254B2

(12) United States Patent
Koike et al.

(10) Patent No.: US 6,824,254 B2
(45) Date of Patent: Nov. 30, 2004

(54) MULTI-NOZZLE INK JET HEAD AND MANUFACTURING METHOD THEREOF

(75) Inventors: Shuji Koike, Setagaya (JP); Yoshiaki Sakamoto, Kawasaki (JP); Tomohisa Shingai, Kawasaki (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

(21) Appl. No.: 10/259,622

(22) Filed: Sep. 30, 2002

(65) Prior Publication Data

US 2003/0030705 A1 Feb. 13, 2003

Related U.S. Application Data

(63) Continuation of application No. PCT/JP00/02139, filed on Mar. 31, 2000.

(51) Int. Cl.[7] ............................ B41J 2/45; B23P 17/00

(52) U.S. Cl. ........................................ 347/71; 29/890.1

(58) Field of Search .............................. 347/68, 70–72; 29/890.1

(56) References Cited

U.S. PATENT DOCUMENTS 6,053,600 A * 4/2000 Hotomi ........................ 347/68

FOREIGN PATENT DOCUMENTS

| | | |
|---|---|---|
| JP | 55-126463 | 9/1980 |
| JP | 5-238007 | 9/1993 |
| JP | 10-202872 | 8/1998 |
| JP | 10-202873 | 8/1998 |
| JP | 11-78003 | 3/1999 |

* cited by examiner

*Primary Examiner*—Judy Nguyen

(74) *Attorney, Agent, or Firm*—Armstrong, Kratz, Quintos, Hanson & Brooks, LLP

(57) ABSTRACT

A multi-nozzle ink jet head formed by semiconductor processes is disclosed. The multi-nozzle head has a nozzle plate (38) in which are formed a plurality of nozzles (39), an FPC (42) in which are formed a plurality of ink chambers (29), and energy generating layers (23, 26, 27), and wiring patterns (42A, 42B) for the energy generating layers are provided on the FPC (42), thus making connection to external circuitry easy.

9 Claims, 13 Drawing Sheets

MULTI-NOZZLE INK JET HEAD AND MANUFACTURING METHOD THEREOF

This application is a continuation of international application PCT/JP00/02139, filed on Mar. 31, 2000.

TECHNICAL FIELD

The present invention relates to a multi-nozzle ink jet head for applying pressure to pressure chambers and ejecting ink drops from nozzles and a manufacturing method thereof, and in particular to a multi-nozzle ink jet head for which the leading out of electrodes from a row of pressure energy generators is improved and a manufacturing method thereof.

BACKGROUND ART

An ink jet recording head has nozzles, ink chambers, an ink supply system, an ink tank, and transducers; by generating pressure in the ink chambers using the transducers, ink particles are ejected from the nozzles, and characters or images are recorded on a recording medium such as paper.

For example, in well-known forms, the transducer is used a heat-generating element, or else a thin-plate-shaped piezoelectric element having the whole of one surface thereof bonded to the outer walls of an ink chamber. In the case that a piezoelectric element is used, a pulse-like voltage is applied to the piezoelectric element, thus bending the composite plate comprising the piezoelectric element and the outer walls of the ink chamber, and the displacement/pressure generated through the bending is transmitted to the inside of the ink chamber via the outer walls of the ink chamber.

A sectioned perspective view of a conventional multi-nozzle ink jet head 100 using piezoelectric elements is shown in FIG. 20. As shown in FIG. 20, the head 100 is constituted from a row of piezoelectric bodies 111, individual electrodes 112 formed on the piezoelectric bodies, a nozzle plate 114 in which are provided nozzles 113, ink chamber walls 117 made of a metal or a resin that, along with the nozzle plate 114, form ink chambers 115 corresponding respectively to the nozzles 113, and a diaphragm 116.

A nozzle 113 and a piezoelectric body 111 are provided for each ink chamber 115, and the periphery of each ink chamber 115 and the periphery of the corresponding diaphragm 116 are connected together strongly. A piezoelectric body 111 for which a voltage has been applied to the individual electrode 112 deforms the corresponding part of the diaphragm 116 as shown by the dashed lines in the drawing. As a result, an ink drop is ejected from the nozzle 113.

Application of voltages to each of the piezoelectric bodies 111 is carried out separately using electrical signals from a printing apparatus main body via printed circuit boards. FIG. 21 is a drawing showing the constitution of connections between the conventional head and the printed circuit boards. In the example of FIG. 21, the head 100 has 8 rows and 8 columns of nozzles 113, i.e. of piezoelectric bodies 111 and individual electrodes 112. Corresponding to this, flexible printed circuit boards 110 are provided for connecting the driver circuitry of the apparatus to the individual electrodes 112.

In this prior art, the individual electrodes 112 are connected to the terminals of the printed circuit boards 110 by wires 120 through wire bonding. Moreover, art in which an FPC wiring board is connected directly is also known.

Moving on, due to demands to increase printing resolution, there are demands to increase the density of the nozzle arrangement on heads. If the nozzle density is raised, then the contact spacing between terminals (internal electrodes) is reduced. For example, the nozzle density of a head using piezoelectric bodies is currently about 150 dpi, but is advancing to 180 to 300 dpi, and further to 360 dpi, and hence the contact spacing is becoming lower.

However, currently the best contact spacing with wire bonding using semiconductor manufacturing is 150 dpi, with 300 dpi contacts being developed in the case of FPC connection. If electrical connection is carried out by providing contacts on top of or near to the piezoelectric bodies 111 as conventionally, then a problem of joining of neighboring contacts (shorting) may arise. Moreover, when connecting a large number of points in a short time, the load on the piezoelectric bodies 111 becomes very high, and with thin-film piezoelectric bodies there is a risk of breakage, and hence connection is extremely problematic.

Moreover, wire bonding requires about 1 second per point, and hence if the number of points rises due to increasing the density, then the manufacturing time increases, leading to an increase in cost. For example, with the example of FIG. 19, there are 48 points, and hence 48 seconds would be required. Furthermore, even in the case of FPC connection, it is necessary to connect the FPC to a printed circuit board having the driving circuitry thereon, and hence it is difficult to reduce the cost.

DISCLOSURE OF THE INVENTION

It is an object of the present invention to provide a multi-nozzle inkjet head, for which connection to driving circuitry can be carried out easily even though the nozzles are arranged at a high density, and a manufacturing method thereof.

Moreover, it is another object of the present invention to provide a multi-nozzle ink jet head, for which connection to the driving circuitry is possible even though connection work is not carried out at the head part, and a manufacturing method thereof.

Furthermore, it is yet another object of the present invention to provide a multi-nozzle ink jet head, for which damage to the head can be prevented and moreover the cost can be reduced, and a manufacturing method thereof.

To attain these objects, a form of the multi-nozzle ink jet head of the present invention has a nozzle plate in which are formed a plurality of nozzles, an ink chamber forming member in which are formed a plurality of ink chambers communicating with the nozzles, energy generating parts that apply energy to the ink chambers for ejecting ink from the nozzles, and wiring patterns that are provided on the ink chamber forming member and are for applying driving signals to the energy generating parts.

A method of manufacturing a multi-nozzle ink jet head of the present invention has a step of forming energy generating parts that apply energy to ink chambers for ejecting ink from nozzles, a step of providing, on the energy generating parts, an ink chamber forming member having wiring patterns for applying driving signals to the energy generating parts, a step of forming, in the ink chamber forming member, a plurality of ink chambers communicating with the nozzles, and a step of providing, on the ink chamber forming member, a nozzle plate in which are formed the plurality of nozzles.

With the present invention, by providing wiring patterns on the ink chamber forming member, the ink chamber forming member is also used as a connecting cable. As a result, it becomes unnecessary to carry out connection at the head part, and hence connection between the head and the driving circuitry becomes easy even though the nozzle density is high, damage to the head can be prevented, and the cost of the head can be reduced.

Moreover, in a PCT application (PCT/JP/99/06960) filed on 10 Dec. 1999, the present inventors proposed a head in which piezoelectric body layers are provided even in regions other than the regions of the pressure chambers, and wiring parts from individual electrodes are provided on the piezoelectric body layers, and hence connection to the outside of the head can be carried out at a position away from the row of the piezoelectric bodies of the pressure chambers.

However, even in that proposal, a connecting cable is necessary for connecting to the external circuitry.

With the present invention, such a connecting cable is not necessary, and hence the connection to the external circuitry is simplified.

Moreover, in the multi-nozzle ink jet head of the present invention, the energy generating parts have a common electrode, energy generating layers that are provided on the common electrode in correspondence with the ink chambers, and individual electrode parts that are provided on the generating layers in correspondence with the ink chambers, and the wiring patterns have wiring patterns for the individual electrode parts, and a wiring pattern for the common electrode. As a result, even with a high nozzle density, a large number of nozzles can be driven easily from external circuitry, and connection to the external circuitry becomes easy.

Moreover, with the multi-nozzle ink jet head of the present invention, by the energy generating layers being piezoelectric body layers, and the wiring patterns being embedded in the ink chamber forming member, the walls of the ink chambers can be reinforced by the wiring patterns.

Moreover, a multi-nozzle ink jet head of the present invention has electrically conductive paths that pass through at least the energy generating layers and electrically connect the individual electrodes to the wiring patterns.

With a method of manufacturing a multi-nozzle ink jet head of the present invention, the step of forming the energy generating parts has a step of providing, on a substrate, a plurality of individual electrodes, and a plurality of energy generating layers, and a step of providing a common electrode on the generating layers, and the step of forming the plurality of ink chambers has a step of forming electrically conductive members for electrically connecting the individual electrodes and the wiring patterns together.

As a result, connection to the individual electrodes can be carried out easily, even though the wiring patterns are provided on the ink chamber forming member.

Moreover, with a multi-nozzle ink jet head of the present invention, control circuitry connected to the wiring patterns is provided on the ink chamber forming member. As a result, the connection becomes yet easier, and simplification is possible.

Moreover, a multi-nozzle ink jet head of the present invention has a metal mask layer provided on the ink chamber forming member for forming the ink chambers, and an electrically conductive layer provided in the pressure chambers for electrically connecting the metal mask layer and the common electrode together.

With a method of manufacturing a multi-nozzle ink jet head of the present invention, the step of forming the plurality of ink chambers comprises a step of forming the plurality of ink chambers using a metal mask formed on the ink chamber forming member, and a step of plating electrically conductive members on the ink chamber forming member, thus forming the above-mentioned electrically conductive members, and at the same time forming, in the ink chambers, an electrically conductive layer that electrically connects the metal mask and the common electrode together.

As a result, the ink chambers can be formed accurately using the metal mask, and moreover the strength of the ink chambers can be increased. Furthermore, through the electrically conductive layer, the common electrode can be connected to the wiring pattern using the metal mask.

Other objects and forms of the present invention will become apparent from the following description of embodiments of the invention and the drawings.

BEST MODE FOR CARRYING OUT THE INVENTION

Next, a description will be given of embodiments of the present invention together with the drawings.

Figure 1:
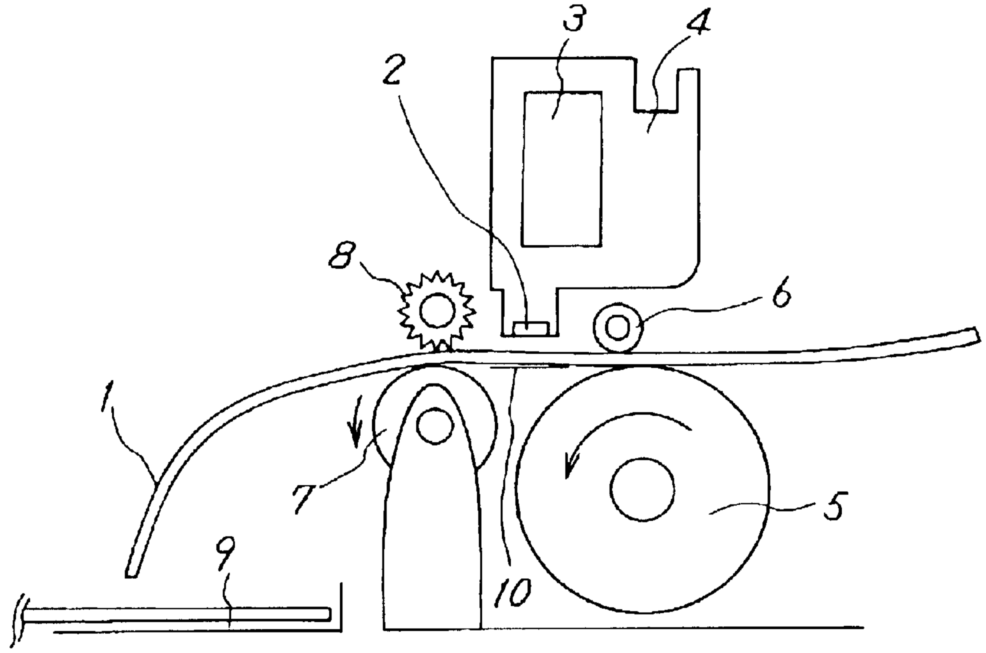
FIG. 1 is a drawing of the constitution of a printer using a multi-nozzle ink jet head of the present invention.

FIG. 1 is a side view of an ink jet recording apparatus using an ink jet head. In the drawing, '1' is a recording medium, on which processing such as printing is carried out using the ink jet recording apparatus. '2' is the ink jet recording head, which ejects ink onto the recording medium 1. '3' is an ink tank, which supplies ink to the ink jet recording head 2. '4' is a carriage, which has therein the ink jet recording head 2 and the ink tank 3.

'5' is a feeding roller, and '6' is a pinch roller; these sandwich the recording medium 1 and convey it towards the ink jet recording head 2. '7' is a discharge roller, and '8' is a pinch roller; these sandwich the recording medium 1, and convey it in a discharge direction. '9' is a stacker, which receives the discharged recording medium 1. '10' is a platen, which pushes against the recording medium 1.

In this embodiment, the ink jet recording head 2 is such that the processing such as printing is carried out on the medium by applying voltages to expand and contract piezoelectric elements and eject ink through the pressure thus generated.

Figure 2:
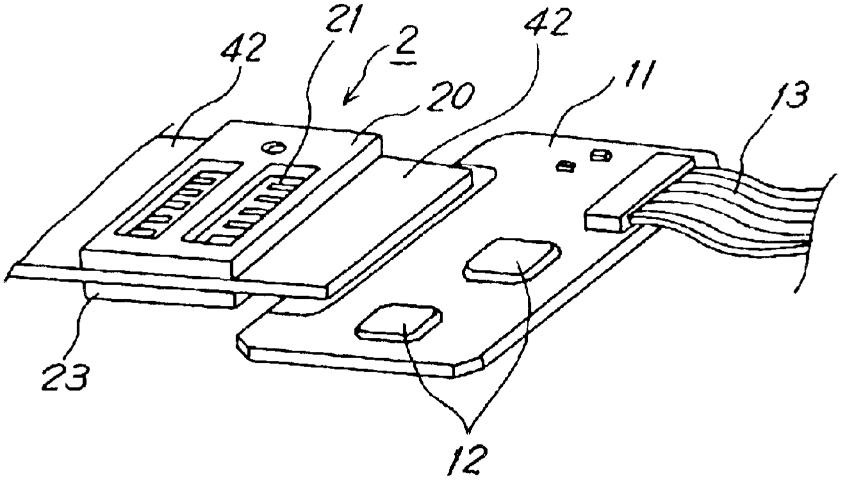
FIG. 2 is a schematic drawing of an ink jet head of an embodiment of the present invention.

FIG. 2 is a drawing of the constitution of peripheral parts of the head of FIG. 1. A main body 23 of the head 2 has a supporting frame 20 for the ink tank 3. An ink supply hole is provided in the supporting frame 20. By setting the ink tank 3 on the supporting frame 20 of the head main body 23, the ink in the ink tank 3 is supplied to the head main body 23. The ink tank 3 on the head main body 23 is thus interchangeable.

The head main body 23 has a large number of nozzles. Here, individual electrodes 21 for the nozzles are shown on the head main body 23. These individual electrodes 21 are provided inside the supporting frame 20. Wiring patterns that connect to the individual electrodes 21 and a common electrode are provided on a pressure chamber forming member 42, described later, of the head main body 23.

The pressure chamber forming member 42 projects out from the head main body 23. Moreover, the pressure chamber forming member 42 is connected to a printed circuit board 11 provided inside the carriage 4. Head driving circuits 12 are provided on the board 11. The board 11 is connected to main control circuitry of the printer main body by an FPC 13.

Consequently, by providing the wiring patterns on the pressure chamber forming member 42, connection can be carried out without providing a cable such as an FPC on the board 11 of the head driving circuits 12. That is, the pressure chamber forming member 42, as well as forming the pressure chambers, also fulfills the role of a wiring cable to the board 11. It is thus possible to connect the individual electrodes 21 of the head and external circuitry together without touching the head main body 23, and moreover a cable is not required. The cost of the head can thus be reduced. It is thus possible to carry out connection without affecting the nozzle parts even though the nozzle density is made high and hence the terminal spacing becomes small.

Figure 6:
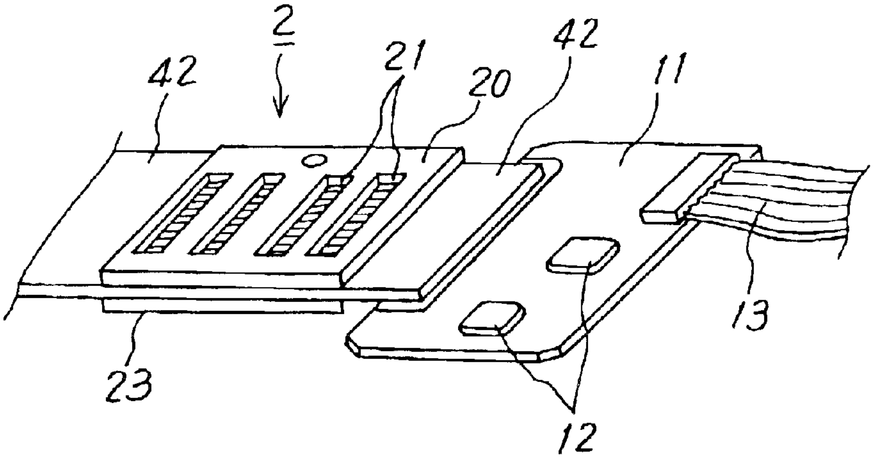
FIG. 6 is an external view of another form of connection for the present invention.

FIG. 6 is a modified example of FIG. 2, and shows application to a 4-row staggered-arrangement head 2. With this head 2, the amount of wiring is yet greater, and hence, as with FIG. 2, it is extremely effective to apply the present invention.

Next, embodiments of the present invention will be described.

[First Embodiment]

Figure 3:
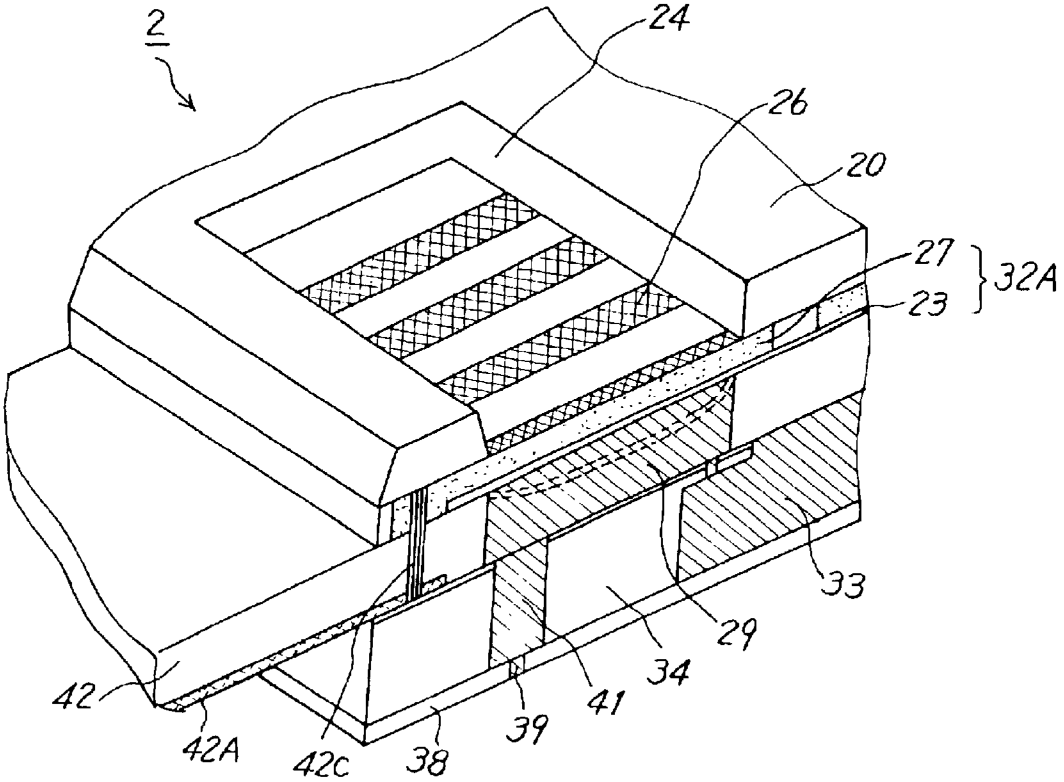
FIG. 3 is a sectioned perspective view of a head of a first embodiment of the present invention.
Figure 4:
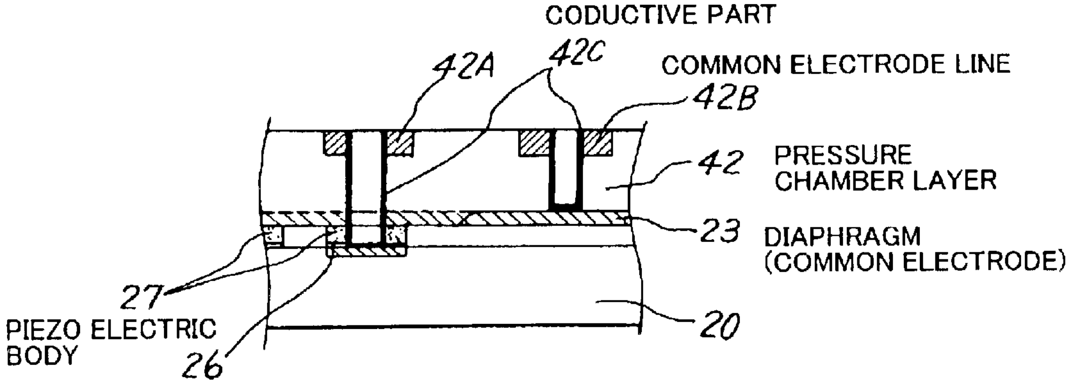
FIG. 4 is a sectional view of major parts of FIG. 3.
Figure 5:
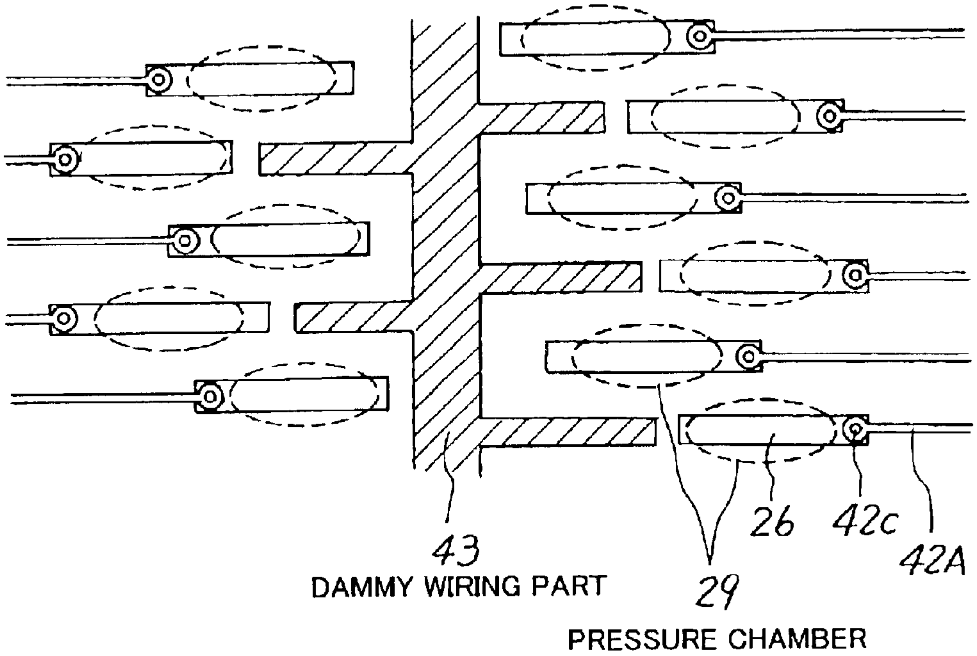
FIG. 5 is a drawing of the wiring patterns of the head of FIG. 3.
Figure 7:
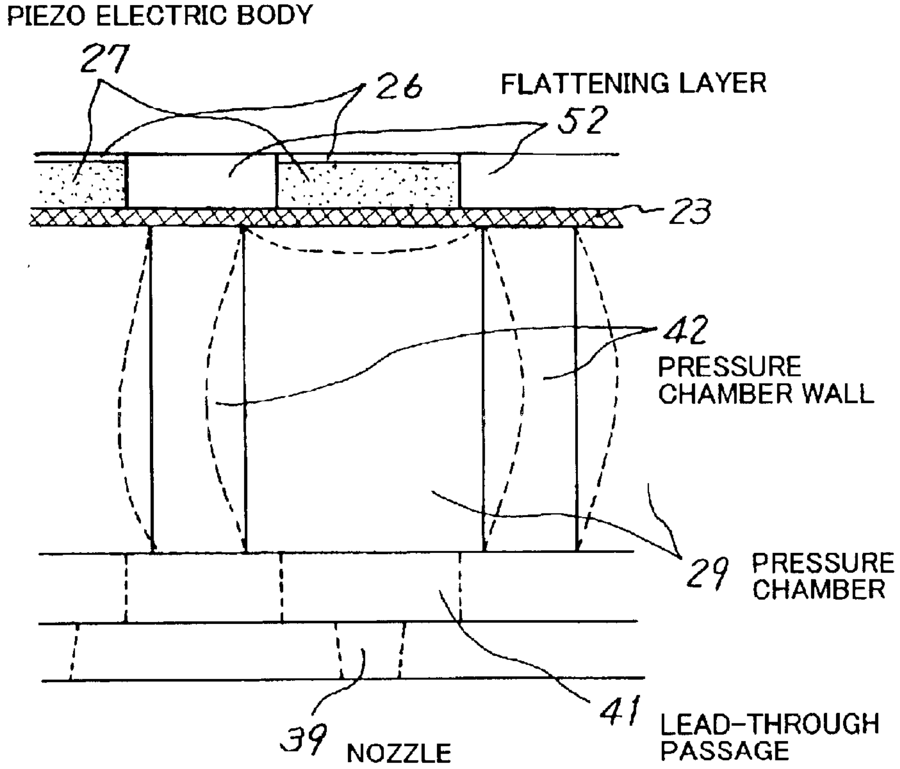
FIG. 7 is an explanatory drawing of a comparative example.
Figure 8:
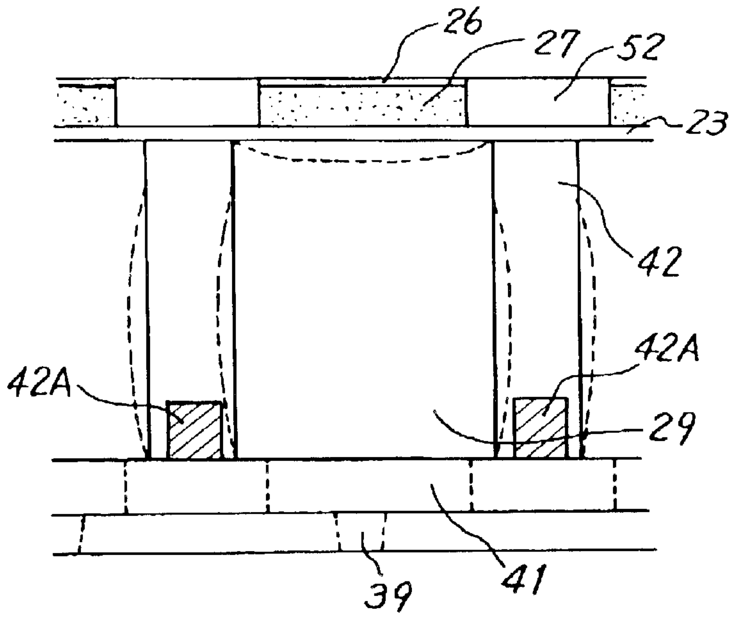
FIG. 8 is a drawing for explaining effects of the first embodiment of the present invention.

FIG. 3 is a sectioned perspective view of the ink jet head 2 of a first embodiment of the present invention, FIG. 4 is a sectional view of major parts of the head of FIG. 3, FIG. 5 is a drawing explaining the wiring patterns of the head of FIG. 3, FIGS. 7 and 8 are drawings for explaining the effects of the present invention, and FIGS. 9 to 12 consist of process diagrams for explaining a method of manufacturing the ink jet head of the first embodiment of the present invention.

As shown in FIG. 3, broadly speaking, the ink jet head 2 is constituted from a substrate 20, main body parts 42 and 34, a nozzle plate 38, ink ejection energy generating parts 32A and so on. As will be described later, the main body part 42 has a laminated structure including an insulating layer and wiring parts, and the main body part 42 also constitutes a pressure chamber forming part, with a plurality of pressure chambers (ink chambers) 29 being formed inside thereof. The main body part 34 has formed therein ink lead-through channels 41, and an ink channel 33 that acts as a supply channel for the ink. Moreover, the top part in the drawing of each pressure chamber 29 is made to be a free part, and the bottom surface of each pressure chamber 29 communicates with the respective ink lead-through channel 41.

Moreover, the nozzle plate 38 is provided on the bottom surface in the drawing of the main body part 34, and a diaphragm 23 is provided on the top surface of the main body part 42. The nozzle plate 38 is made for example of stainless steel, and has nozzles 39 formed therein in positions facing the ink lead-through channels 41.

Moreover, in the present example, chromium (Cr) is used for the diaphragm 23, and the energy generating parts 32A are arranged on top of the diaphragm 23. The substrate 20 is made for example of magnesium oxide (MgO), and an opening part 24 is formed in a central position thereof. The energy generating parts 32A are formed on the diaphragm 23 so as to be exposed via the opening part 24.

Each energy generating part 32A is constituted from the diaphragm 23 (which also acts as a common electrode), an individual electrode 26, and a piezoelectric body 27. The energy generating parts 32A are formed in positions corresponding to the positions of formation of the pressure chambers 29, a plurality of which are formed in the main body part 42.

The individual electrodes 26 are made for example of platinum (Pt), and are formed on the upper surfaces of the piezoelectric bodies 27. Moreover, the piezoelectric bodies 27 are crystalline bodies that generate piezoelectricity, and in the present example the constitution is such that each is formed independently in the position of formation of the respective pressure chamber 29 (i.e. neighboring energy generating parts are not connected to one another).

Moreover, a characteristic feature of the head 2 is that the pressure chamber forming member 42 is formed from an insulating resin, and wiring patterns 42A and 42B are formed on a surface thereof. As shown in FIG. 5, the wiring patterns 42A form signal lines for the individual electrodes 26, and the wiring pattern 42B forms a signal line for the common electrode (here, the diaphragm) 23. The pressure chamber forming member 42 extends out from the main body of the head 2, and as shown in FIG. 2, is connected to an external circuit board 11.

As shown in FIGS. 3 and 4, an end part of each wiring pattern 42A is electrically connected to the respective individual electrode 26 by an electrically conductive part 42C that passes through the pressure chamber forming member 42 and the piezoelectric body layer 27. As shown in FIG. 4, an end part of the wiring pattern 42B is electrically connected to the diaphragm 23 by an electrically conductive part 42C that passes through the pressure chamber forming member 42.

The pressure chamber forming member 42 of the head 2, as well as forming the pressure chambers 29, thus also acts as a wiring member (FPC). Moreover, the wiring patterns 42A and 42B are provided on the rear surface (nozzle side) of the pressure chamber forming member 42.

In the case of the ink jet head 2 having the constitution described above, when a voltage is applied between the diaphragm 23, which also functions as the common electrode, and an individual electrode 26 via the wiring patterns 42A and 42B, then distortion is generated in the piezoelectric body 27 due to the phenomenon of piezoelectricity. Even though distortion is generated in the piezoelectric body 27 in this way, the diaphragm 23, which is a rigid body, tries to maintain its state. As a result, in the case for example that the piezoelectric body 27 distorts in a direction so as to contract through the application of the voltage, then deformation occurs such that the diaphragm 23 side becomes convex. The diaphragm 23 is fixed at the periphery of the pressure chamber 29, and hence the diaphragm 23 deforms into a shape that is convex towards the pressure chamber 29, as shown by the dashed lines in FIG. 3.

Consequently, due to the deformation of the diaphragm 23 accompanying the distortion of the piezoelectric body 27, the ink in the pressure chamber 29 is pressurized, and hence is ejected to the outside via the ink lead-through channel 41 and the nozzle 39, and as a result printing is carried out on the recording medium.

In the case of the ink jet head 2 according to the present example having the above constitution, the diaphragm 23, and the individual electrodes 26 and the piezoelectric bodies 27, which constitute the energy generating parts 32A, are formed using thin film formation technology (the manufacturing method will be described in detail later).

By forming the diaphragm 23 and the energy generating parts 32A using thin film formation technology in this way, it is possible to form thin (50 $\mu$m or less) miniaturized energy generating parts with high precision and high reliability. It is thus possible to reduce the power consumption of the ink jet head 2, and moreover high-resolution printing can be made possible.

Moreover, with the present example, the constitution is such that the energy generating parts 32A are divided, with each energy generating part 32A being in a position corresponding to one of the pressure chambers 29. Each energy generating part can thus displace without being constrained by the neighboring energy generating parts. The applied voltage required for ink ejection can thus be reduced, and hence the power consumption of the ink jet head can also be reduced due to this.

Here, the wiring patterns described earlier produce further effects in such a piezoelectric type head. FIG. 7 is a sectional view of a piezoelectric type head, and shows a conventional example. As shown in FIG. 7, when pressure is applied to a pressure chamber 29 by a piezoelectric body 27 and the diaphragm 23, the pressure chamber walls 42 bend. In particular, in the case that a resin is used as the pressure chamber forming member 42, the rigidity of the pressure chamber walls is low. Furthermore, with a head having a high nozzle density, the pressure chamber walls cannot be made sufficiently thick. For example, with a 150 dpi head, the thickness of the pressure chamber walls is about 70 $\mu$m, and the rigidity also drops on account of this. The bending of the pressure chamber walls causes loss of pressure, and hence the ink ejection pressure drops. In particular, with a thin-film head, the piezoelectric bodies 27 are thin, and the generated pressure is low, and hence there is a risk that ink ejection may become impossible due to the pressure loss.

However, when wiring patterns 42A are provided in the pressure chamber forming member 42, then the wiring patterns 42A will be positioned in the pressure chamber walls on each side of each pressure chamber 29 as shown in FIG. 5. That is, as shown in FIG. 8, because the wiring patterns 42A are present in the pressure chamber walls 42, and the wiring patterns 42A are constituted from a material having high rigidity such as a metal, the pressure chamber walls 42 are reinforced, i.e. become more rigid.

As a result, the bending of the pressure chamber walls 42 shown in FIG. 7 can be reduced, and hence the pressure loss can be reduced. Moreover, as shown in FIG. 5, by providing dummy wiring parts 43 to the pressure chambers which has no wiring pattern on either side, all of the pressure chamber walls can be reinforced.

Next, a method of manufacturing the ink jet head 2 having the constitution described above will be described using FIGS. 9 to 12.

Figure 9A:
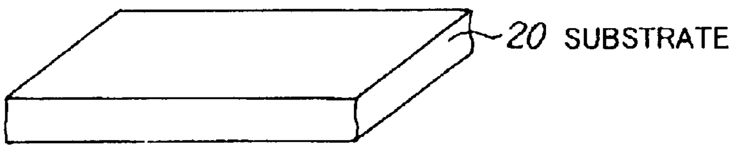
FIGS. 9(A), 9(B), 9(C), 9(D) and 9(E) consist of (first) explanatory drawings of a manufacturing process of the head of FIG. 3.
Figure 9B:
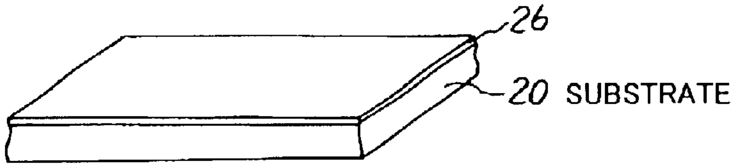
Figure 9C:
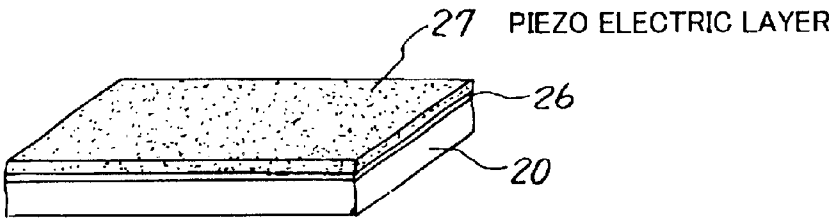

To manufacture the ink jet head 2, firstly a substrate 20 is prepared as shown in FIG. 9(A). In the present example, a magnesium oxide (MgO) monocrystal of thickness 0.3 mm is used as the substrate 20. An individual electrode layer 26 (hereinafter referred to merely as the 'electrode layer') and a piezoelectric body layer 27 are formed in order on the substrate 20 using sputtering, which is a thin film formation technique, as shown in FIGS. 9(B) and 9(C). In the present example, platinum (Pt) is used as the material of the electrode layer 26.

Figure 9D:
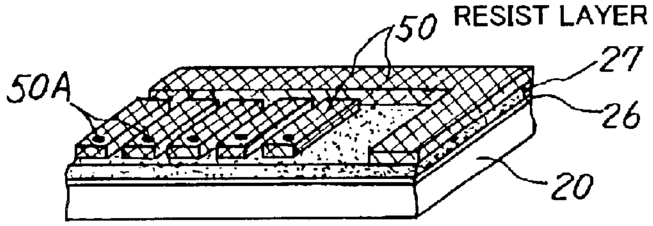

Next, a milling pattern for dividing the above laminate into portions in positions corresponding to the pressure chambers that will be formed later is formed from a dry film resist (hereinafter referred to as 'DF-1') 50. FIG. 9(D) shows the state after the DF-1 pattern 50 has been formed; the DF-1 pattern 50 is formed in places where the electrode layer 26 and the piezoelectric body layer 27 are to be left behind. Moreover, through hole forming parts 50A for obtaining contact between the electrode layer 26 and the wiring parts 42A are then formed.

In the present example, FI-215 (made by Tokyo Ohka Kogyo Co., Ltd.; alkali type resist, thickness 15 $\mu$m) was used as the DF-1, and after laminating on at 2.5 kgf/cm, 1 m/s and 115° C., 120 mJ exposure was carried out with a glass mask, preliminary heating at 60° C. for 10 minutes and then cooling down to room temperature were carried out, and then developing was carried out with a 1 wt % $Na_2CO_3$ solution, thus forming the pattern.

Figure 9E:
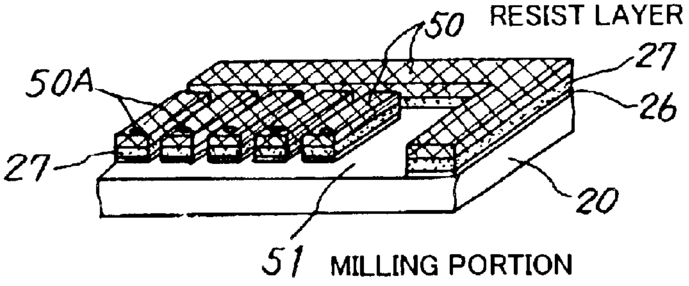

The substrate was fixed to a copper holder using grease (Apiezon L Grease) having good thermal conductivity, and milling was carried out at 700V using Ar gas only with an irradiation angle of 15°. As a result, the shape became as shown in FIG. 9(E), with the taper angle in the depth direction of the milled parts 51 becoming perpendicular, i.e. at least 85°, relative to the surface. Moreover, through holes 42C are also formed.

Figure 10F:
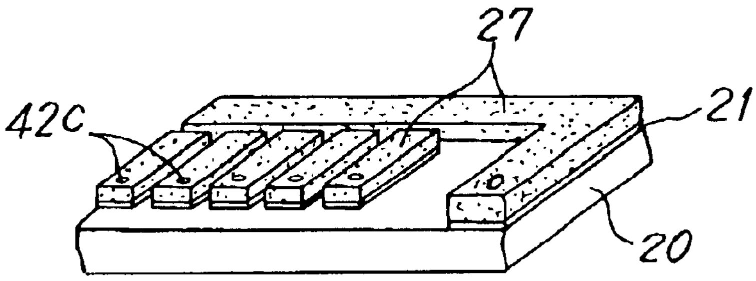
FIGS. 10(F), 10(G) and 10(H) consist of (second) explanatory drawings of the manufacturing process of the head of FIG. 3.
Figure 10G:
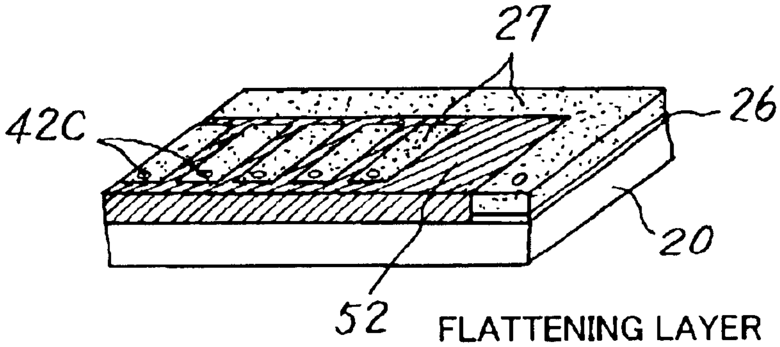

Next, the resist layer 50 is stripped off as shown in FIG. 10(F), and then, so that the diaphragm 23 can be made flat, and also to carry out insulation between the upper electrodes (electrode layer 26) and the diaphragm 23, which is the common electrode, at the milled parts, an insulating flattening layer 52 is formed in the milled parts, as shown in FIG. 10(G). Note, however, that the flattening layer 52 is not formed in the through holes 42C.

Figure 10H:
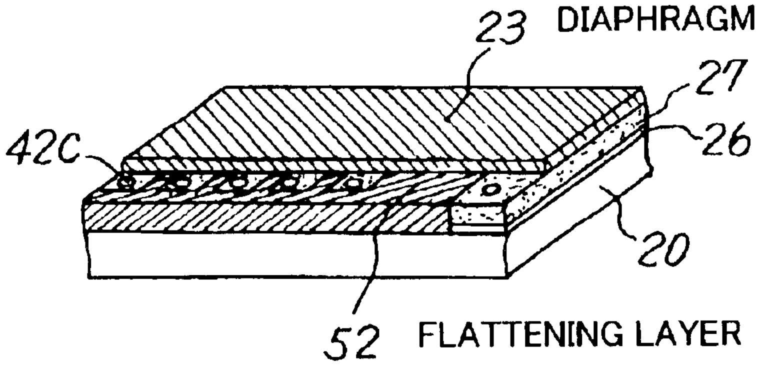

Next, as shown in FIG. 10(H), the diaphragm 23 is deposited by sputtering, thus forming the actuator parts. As the diaphragm 23, Cr was formed to 1.5 cm over the whole surface by sputtering. As shown in FIG. 10(H), the diaphragm 23 is provided excluding the region of the through holes 42C.

Figure 11I:
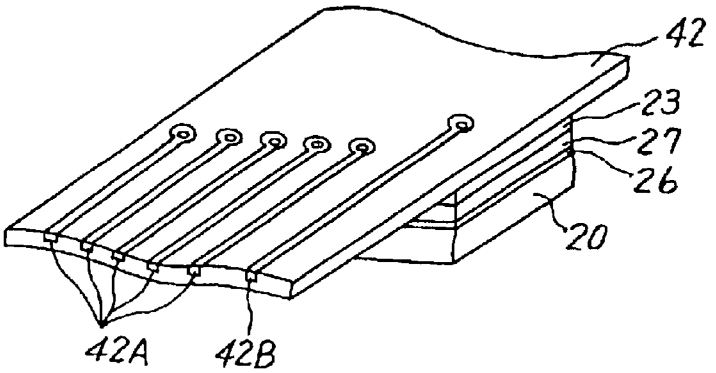
FIGS. 11(I), 11(J) and 11(K) consist of (third) explanatory drawings of the manufacturing process of the head of FIG. 3.

After the formation of the various layers 26 to 23 has been completed as described above using thin film formation techniques, next an FPC (pressure chamber forming member) 42 is joined onto the diaphragm 23 as shown in FIG. 11(I). The FPC 42 is made from a polyimide resin, and has formed thereon the wiring patterns 42A and 42B, which have through holes for connection at their tips.

Figure 11J:
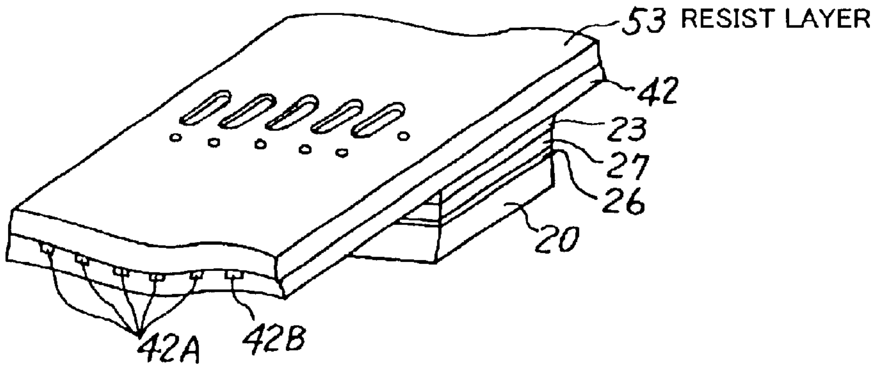

Next, pressure chamber opening parts 29 are formed in the FPC 42 in positions corresponding to the respective piezoelectric bodies of the layers 23 to 26. In the present example, the formation was carried out using a solvent type dry film resist (hereinafter referred to as 'DF-2') 53 as shown in FIG. 11(J). The DF-2 used was PR-100 series (made by Tokyo Ohka Kogyo Co., Ltd.); laminating on was carried out at 2.5 kgf/cm, 1 m/s and 35° C., 180 mJ exposure was carried out using a glass mask, and then preliminary heating at 60° C. for 10 minutes and then cooling to room temperature were carried out. Developing was carried out using C-3 and F-5 solutions (made by Tokyo Ohka Kogyo Co., Ltd.), thus carrying out pattern formation on the resist film 53.

Figure 11K:
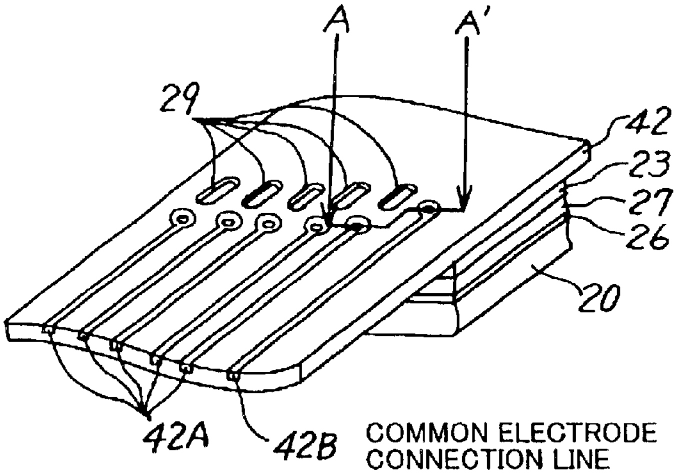

Using the resist film 53 as a mask, the FPC 42 is subjected to plasma etching, and then the resist film 53 is stripped off, whereby the pressure chambers 29 are formed in the FPC 42 as shown in FIG. 11(K). Moreover, the through holes for connecting are formed at the tips of the wiring patterns 42A and 42B. After this, electrically conductive plating (not shown) is carried out inside the through holes, thus carrying out electrical connection of the wiring patterns 42A and 42B to the individual electrodes 26 and the diaphragm 23. That is, the section along A—A in this state is as shown in FIG. 4, with the electrically conductive parts 42C having being formed.

Moreover, a main body part 34 having the lead-through channels 41 and a nozzle plate 38 are formed through a process separate to the process described above. The main body part 34 is formed on the nozzle plate 38 (which has alignment marks, not shown) by laminating on a dry film (PR series solvent type dry film made by Tokyo Ohka Kogyo Co., Ltd.) and exposing a required number of times and then developing.

The specific method of forming the main body part 34 is as follows. On the nozzle plate 38 (thickness 20 $\mu$m), a pattern of ink lead-through channels 41 (diameter 60 $\mu$m; depth 60 $\mu$m) for leading ink from the pressure chambers 29 to the nozzles 39 (diameter 20 $\mu$m, straight holes) and making the ink flow be in one direction is exposed using the alignment marks on the nozzle plate 38, next the structure is left naturally (at room temperature) for 10 minutes and then curing is carried out by heating (60° C., 10 minutes), and then unwanted parts of the dry film are removed by solvent developing.

Figure 12L:
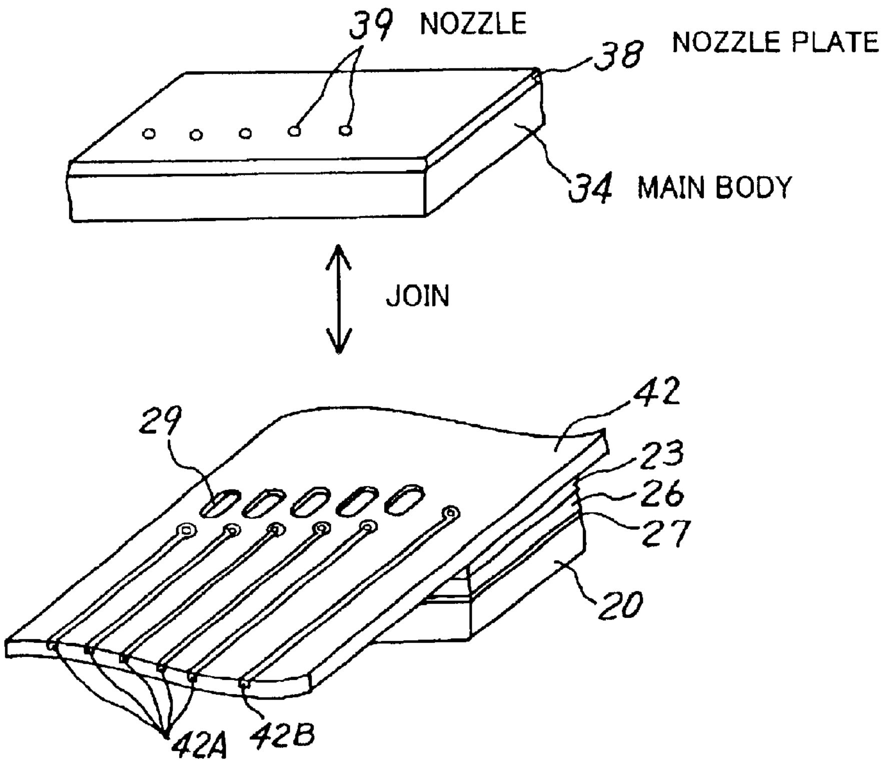
FIGS. 12(L) and 12(M) consist of (fourth) explanatory drawings of the manufacturing process of the head of FIG. 3.

The main body part 34 provided with the nozzle plate 38 formed as described above is joined (joined and fixed) to the other main body part 42 having the actuator parts as shown in FIG. 12(L). At this time, the joining is carried out such that the main body parts 34 and 42 face one another accurately at the pressure chamber 29 parts. The joining is carried out using alignment marks on the piezoelectric body parts and alignment marks formed on the nozzle plate, by carrying out, at a load of 15 kgf/cm$^2$, preliminary heating at 80° C. for 1 hour followed by main joining at 150° C. for 14 hours, and then allowing natural cooling to take place.

Next, the substrate of the driving parts is removed so that the actuators will be able to vibrate. That is, the substrate 20 is turned upside down so that the nozzle plate 38 is on the underside, and an opening part 24 is formed by removing approximately the central part of the substrate 20 by etching (removal step).

Figure 12M:
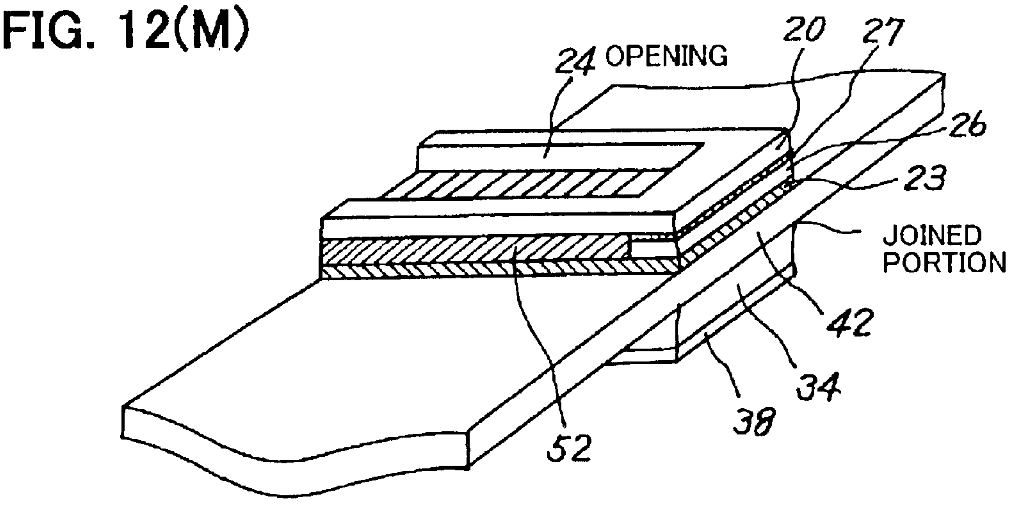

The position in which the opening part is formed is selected so as to correspond to at least the deformation region in which the diaphragm 23 is deformed by the energy generating parts 32A (see FIG. 3). By removing the substrate 20 and forming the opening part 24 in this way, the constitution becomes such that the electrode layer 26 is exposed from the substrate 20 via the opening part 24 as shown in FIG. 12(M).

As described above, according to the present example, the energy generating parts are formed on the substrate 20 by forming an electrode layer 26, a piezoelectric body layer 27 and a diaphragm 23 in order using a thin film formation technique such as sputtering; compared with conventionally, thin energy generating parts can thus be formed with higher precision (i.e. with the same shape as the upper electrodes) and with higher reliability.

Moreover, an FPC having wiring patterns is used as the pressure chamber forming member 42, and the pressure chambers 29 are formed therein, and hence wiring can be carried out at the same time.

[Second Embodiment]

Figure 13:
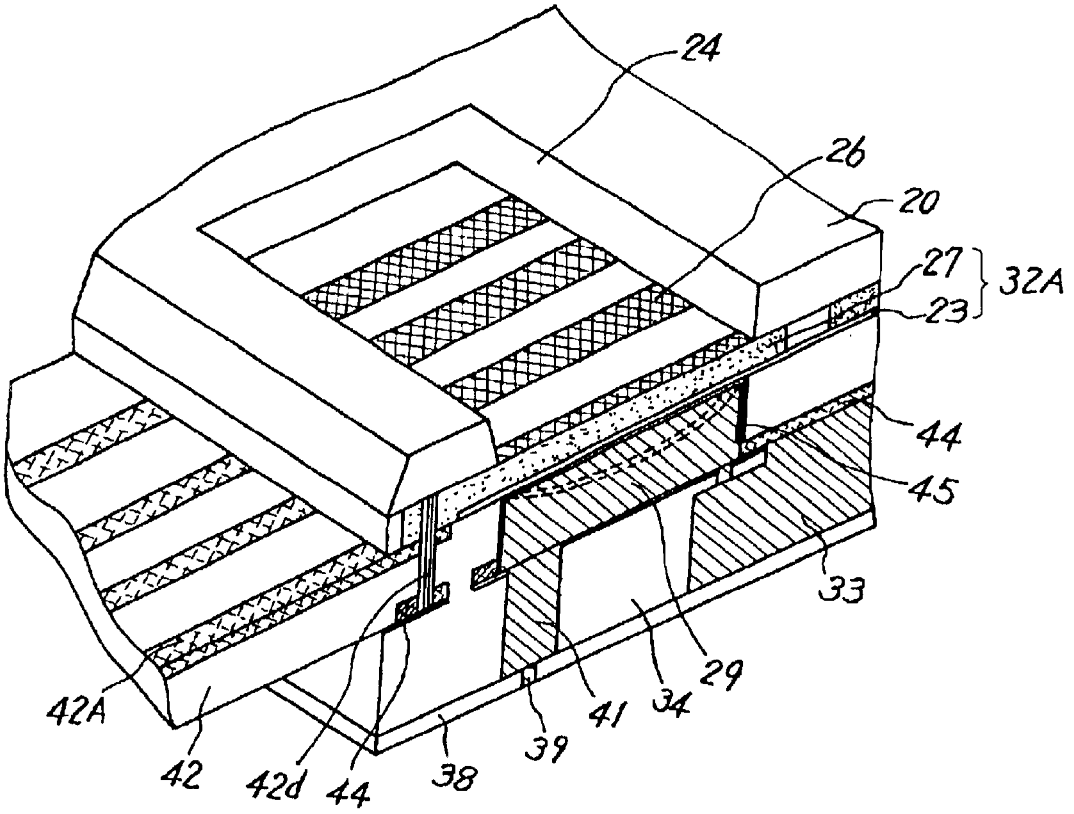
FIG. 13 is a top view of an ink jet head of a second embodiment of the present invention.
Figure 14:
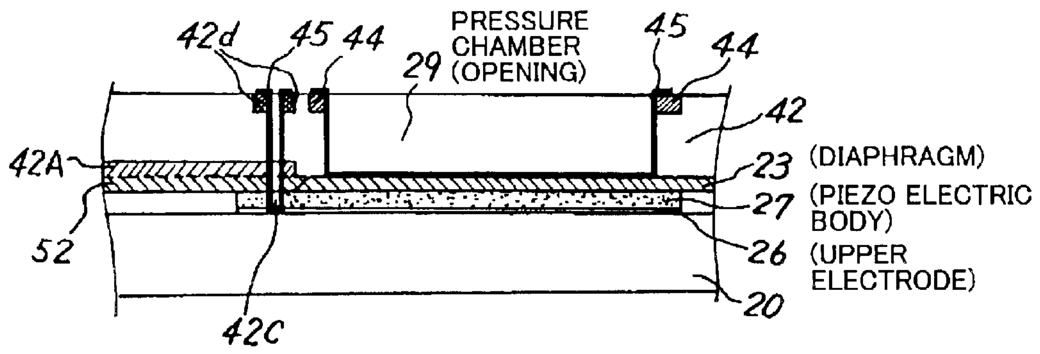
FIG. 14 is a sectional view of major parts of FIG. 13.
Figure 15:
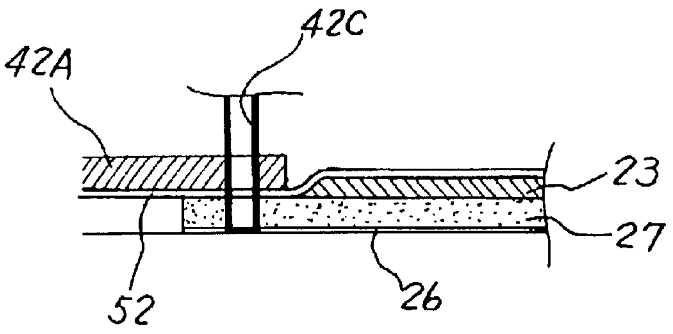
FIG. 15 is an enlarged view of FIG. 14.
Figure 16:
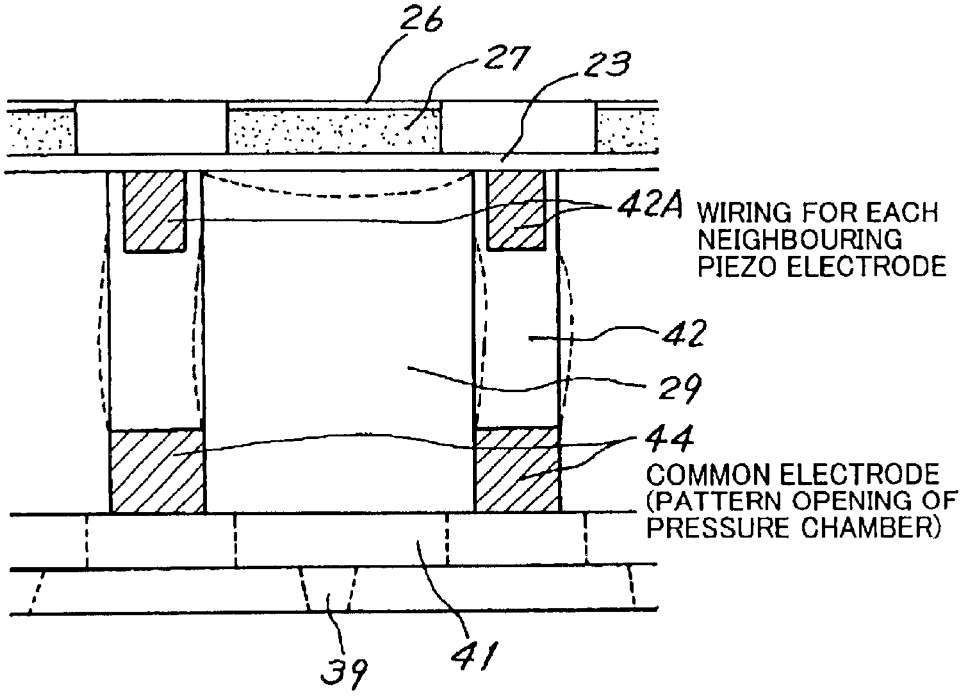
FIG. 16 is a drawing for explaining the operation of the constitution of FIG. 13.
Figure 17A:
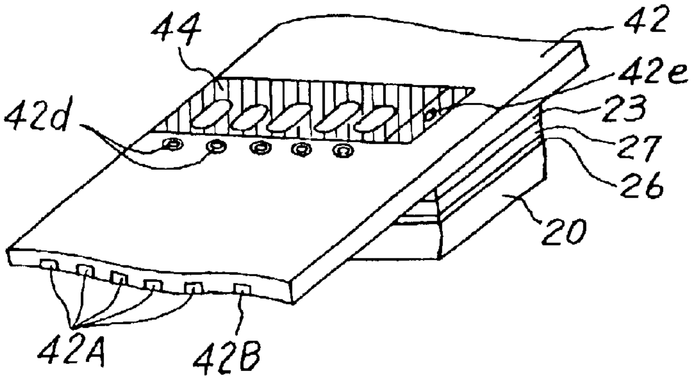
FIGS. 17(A), 17(B) and 17(C) consist of (first) explanatory drawings of a manufacturing process of the head of FIG. 13.
Figure 17B:
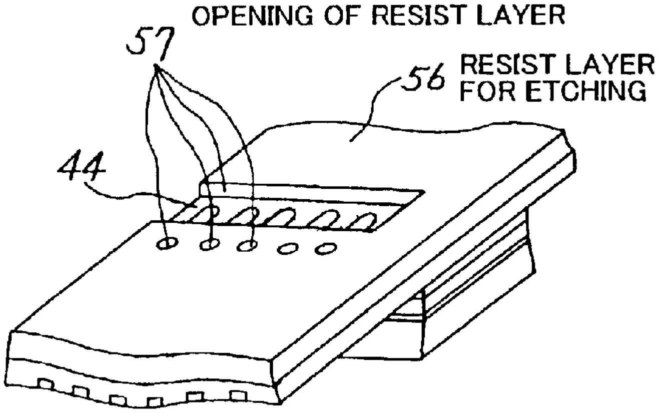
Figure 17C:
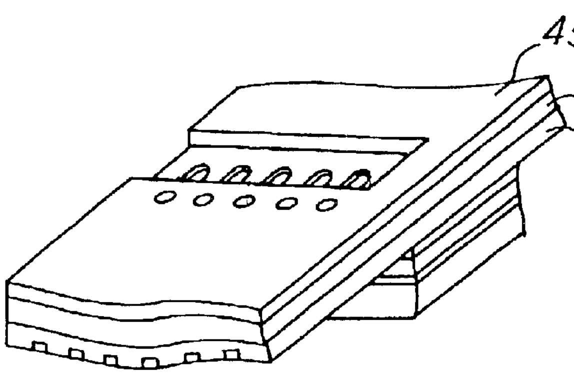
Figure 18:
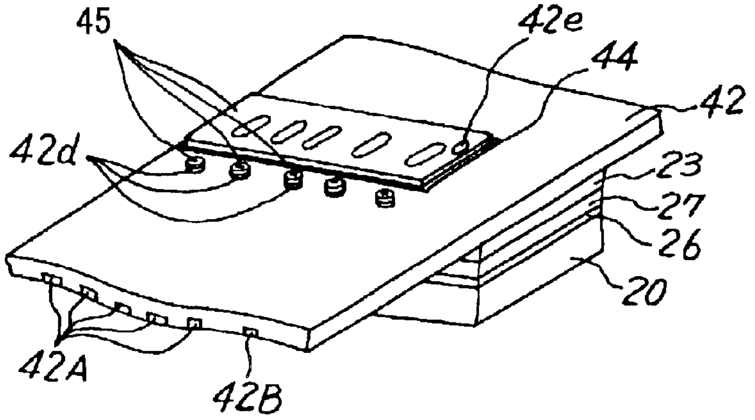
FIG. 18 consists of (second) explanatory drawings of the manufacturing process of the head of FIG. 13.

FIG. 13 is a sectioned perspective view of the head of a second embodiment of the present invention, FIG. 14 is a sectional view of connecting parts in FIG. 13, FIG. 15 is an enlarged view of FIG. 14, FIG. 16 is a drawing for explaining the operation of the head, and FIGS. 17 and 18 consist of explanatory drawings of a manufacturing process of the head.

The present embodiment is an improvement of the head of FIG. 3, and elements the same as ones shown in FIG. 3 are represented by the same reference numerals. As shown in FIGS. 13 and 14, the wiring patterns 42A and 42B are formed on the front surface (substrate 20 side) of the pressure chamber forming member (FPC) 42. Moreover, a metal mask 44 for forming the pressure chambers 29 is provided on the FPC 42. This metal mask 44 fulfills a role of reinforcing the pressure chamber walls. Furthermore, metal layers 45 are plated onto the wall surfaces of the pressure chambers 29, thus electrically connecting the diaphragm 23 and the metal mask 44 together.

Before explaining this constitution, a method of manufacturing the head will be explained using FIGS. 17 and 18. FIGS. 17 and 18 show an example of a modification of the steps of FIGS. 11(I) to 11(K); the other steps are as in the first embodiment. As shown in FIG. 17(A), the FPC 42 is joined onto the diaphragm 23. On the rear surface in the drawing of the FPC 42 are formed the wiring patterns 42A and 42B, and on the front surface are formed the metal mask 44 for forming the pressure chambers, and metal masks 42*d* for forming the through holes of the electrically conductive parts.

As shown in FIG. 17(B), a resist layer 56 for etching is formed on the FPC 42. Opening parts 57 are provided in this resist layer 56. Plasma etching of the FPC 42 is carried out, using the resist layer 56 as a mask. At this time, the metal masks 44 and 42*d* act as masks, and hence the pressure chambers 29 can be formed accurately, and the accuracy of the through holes is also improved.

Then, as shown in FIG. 17(C), metal plating is carried out over the whole surface, using the resist layer as a mask, thus forming a metal plating layer 45. Then, the resist layer 56 is stripped off, whereby, as shown in FIG. 18, plating layers 45 are formed in the pressure chambers 29 due to the metal mask 44 on the FPC 42, plating layers 45 are formed inside the through holes, and a plating layer 45 is formed in a through hole 42*e*. As shown in the cross-sections of FIGS. 14 and 15, the electrically conductive parts 42C that connect the wiring patterns 42A to the individual electrodes 26 are thus formed, and moreover the diaphragm 23 and the metal mask 44 are electrically connected together, and the metal mask 44 is connected to the wiring pattern 42A by the electrically conductive part 42C via the through hole 42*e*. As shown in FIG. 16, the metal mask 44 reinforces the pressure chamber walls 42, thus increasing the rigidity of the pressure chamber walls 42. Moreover, due to being provided on the diaphragm 23 side, the wiring patterns 42A increase the strength of the fixing supporting parts for the diaphragm 23, and hence unwanted deformation of the diaphragm 23 can be prevented.

That is, by providing the wiring patterns 42A and 42B on the front surface of the FPC 42, the fixation and support of the diaphragm can be made strong, and hence unwanted deformation of the diaphragm can be prevented. Moreover, the strength of the pressure chambers can be increased through the metal mask 44.

In particular, in the case of a high nozzle density, even though a resin is provided as the pressure chamber forming member 42 to make the manufacturing easy, and moreover the pressure chamber walls are thin, pressure loss of the piezoelectric bodies can be prevented. With the metal mask 44, the pressure chambers 29 can be formed accurately.

Furthermore, through the plating layers 45, electrically conductive parts are formed between the wiring patterns and the electrodes, and moreover metal layers 55 can be formed inside the pressure chambers. As a result, it becomes possible to electrically connect the diaphragm 23 and the metal mask 44 together. Moreover, the metal layers 55 also fulfill a role of protecting the pressure chamber walls from the ink. The pressure chamber walls can also be reinforced due to the thickness of the metal layers.

[Third Embodiment]

Figure 19:
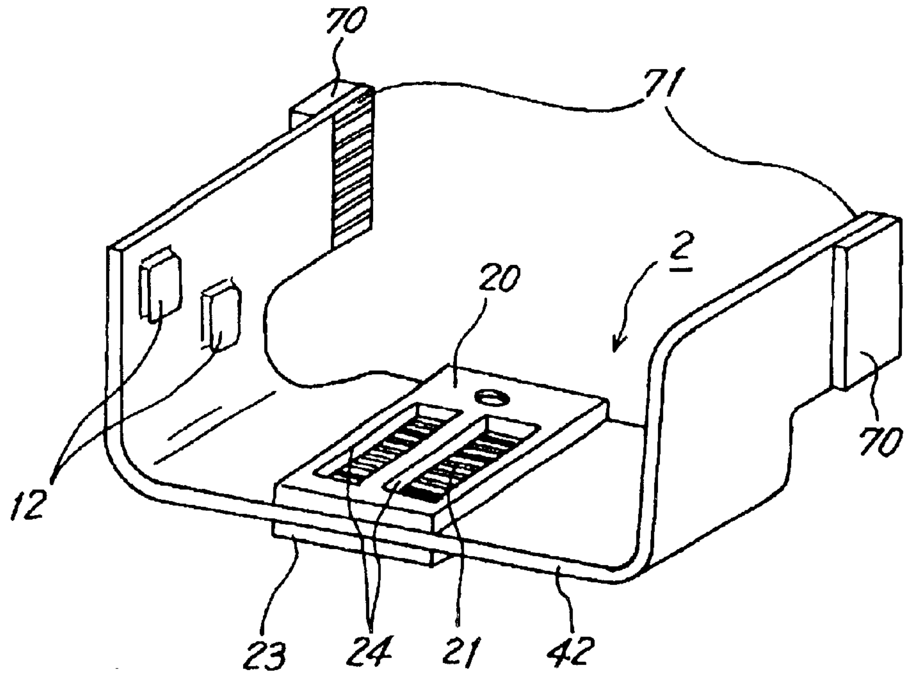
FIG. 19 is a drawing of the constitution of an ink jet head of a third embodiment of the present invention.
Figure 20:
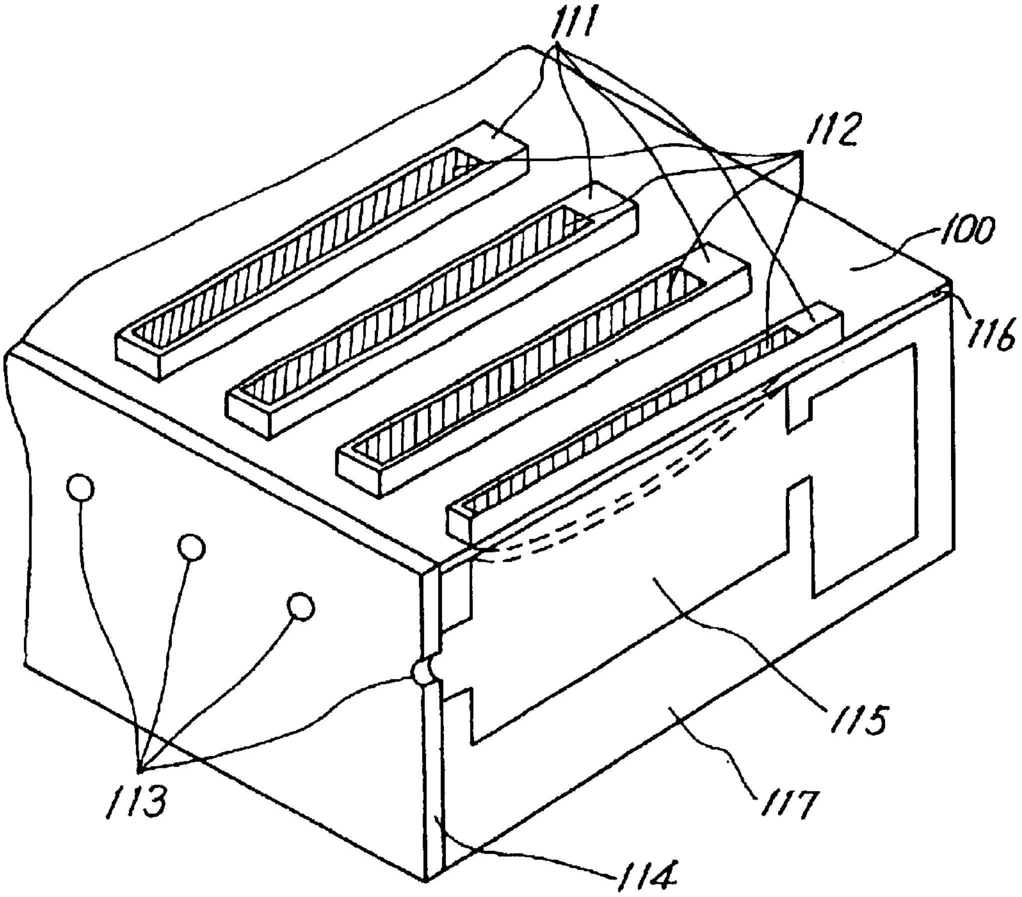
FIG. 20 PRIOR ART
FIG. 20 is a drawing of the constitution of a conventional multi-nozzle ink jet head.
Figure 21:
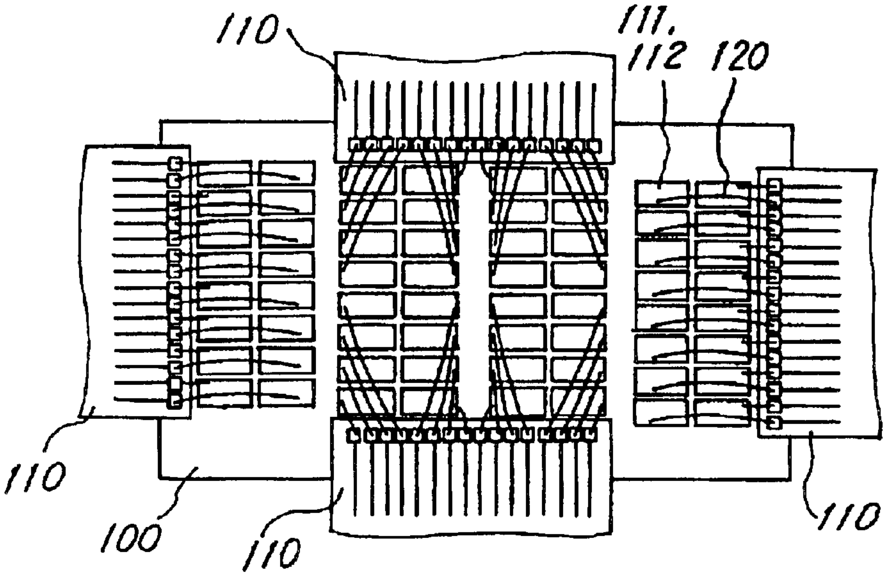
FIG. 21 PRIOR ART
FIG. 21 is a drawing of the connection system for the conventional ink jet head.

FIG. 19 is a drawing of the constitution of the head of a third embodiment of the present invention; elements the same as ones shown in FIG. 2 and FIG. 6 are represented by the same reference numerals.

In this embodiment, driving circuits 12, connectors 71, and reinforcing plates 70 are provided on an FPC, which is the pressure chamber forming member 42 described above. As a result, because the driving circuits 12 are joined directly to the head itself, the contact process for the wiring becomes unnecessary, and moreover the cost can be reduced. Moreover, when manufacturing the head, the state of each of the elements can be inspected using the circuits, and hence temporary connection for the inspection is not necessary, which is very effective for reducing the cost of inspection.

The present invention was described above through embodiments; however, various modifications are possible within the scope of the purport of the present invention, and these are not excluded from the scope of the present invention; for example, instead of making the energy generating layer be a piezoelectric layer, another energy generating layer such as a heat generating layer may be used.

INDUSTRIAL APPLICABILITY

As described above, according to the present invention, the ink chamber forming part is constituted from an FPC, and hence it becomes possible to carry out connection to external circuitry without damaging the head, and moreover connection to the external circuitry can be carried out without requiring a separate FPC, and hence the electrical connection system of the head can be simplified, which contributes to reducing the cost.

What is claimed is:

1. A multi-nozzle ink jet head having a plurality of nozzles that eject ink, comprising:

a nozzle plate in which are formed said plurality of nozzles;

an ink chamber forming member in which are formed a plurality of ink chambers communicating with said nozzles;

an energy generating part that apply energy to said ink chambers for ejecting ink from said nozzles; and wiring patterns that are provided on said ink chamber forming member and are for applying driving signals to said energy generating part, wherein said wiring patterns are embedded in said ink chamber forming member.

2. The multi-nozzle ink jet head according to claim 1, wherein said energy generating part comprises:

a common electrode;

energy generating layers that are provided on said common electrode in correspondence with said each ink chambers; and individual electrode parts that are provided on said generating layer in correspondence with said ink chambers, and wherein said wiring patterns comprises:

wiring patterns for said individual electrode parts; and a wiring pattern for said common electrode.

3. A multi-nozzle ink jet head having a plurality of nozzles that eject ink, comprising:

a nozzle plate in which are formed said plurality of nozzles;

an ink chamber forming member in which are formed a plurality of ink chambers communicating with said nozzles;

an energy generating part that apply energy to said ink chambers for ejecting ink from said nozzles; and wiring patterns that are provided on said ink chamber forming member and are for applying driving signals to said energy generating part, wherein said energy generating part comprises:

a common electrode;

energy generating layers that are provided on said common electrode in correspondence with said each ink chambers; and individual electrode parts that are provided on said generating layer in correspondence with said ink chambers, and wherein said wiring patterns comprises:

wiring patterns for said individual electrode parts; and a wiring pattern for said common electrode, wherein that said energy generating layers are piezoelectric body layers, and said wiring patterns are embedded in said ink chamber forming member.

4. A multi-nozzle ink jet head having a plurality of nozzles that eject ink, comprising:

a nozzle plate in which are formed said plurality of nozzles;

an ink chamber forming member in which are formed a plurality of ink chambers communicating with said nozzles;

an energy generating part that apply energy to said ink chambers for ejecting ink from said nozzles; and wiring patterns that are provided on said ink chamber forming member and are for applying driving signals to said energy generating part, wherein said energy generating part comprises:

a common electrode;

energy generating layers that are provided on said common electrode in correspondence with said each ink chambers; and individual electrode parts that are provided on said generating layer in correspondence with said ink chambers, and wherein said wiring patterns comprises:

wiring patterns for said individual electrode parts; and a wiring pattern for said common electrode, wherein further comprising electrically conductive paths that pass through at least said energy generating layers and electrically connect said individual electrodes to said wiring patterns.

5. The multi-nozzle ink jet head according to claim 2, wherein further comprises a control circuitry connected to said wiring patterns on said ink chamber forming member.

6. The multi-nozzle inkjet head according to claim 2, wherein further comprising a metal mask layer provided on said ink chamber forming member for forming said ink chambers, and an electrically conductive layer provided in said pressure chambers for electrically connecting said metal mask layer and said common electrode together.

7. A method of manufacturing a multi-nozzle ink jet head having a plurality of nozzles that eject ink, comprising the steps of:

forming an energy generating part that apply energy to ink chambers for ejecting ink from said nozzles;

providing, on said energy generating part, an ink chamber forming member having embedded wiring patterns for applying driving signals to said energy generating parts;

forming, in said ink chamber forming member, a plurality of ink chambers communicating with said nozzles; and providing, on said ink chamber forming member, a nozzle plate in which are formed said plurality of nozzles.

8. The method of manufacturing a multi-nozzle ink jet head according to claim 7, wherein the step of forming said energy generating part comprises the steps of:

providing, on a substrate, a plurality of individual electrodes, and a plurality of energy generating layers, and providing a common electrode on said energy generating layers, and wherein the step of forming said plurality of ink chambers comprises the step of forming electrically conductive members for electrically connecting said individual electrodes and said wiring patterns together.

9. The method of manufacturing a multi-nozzle ink jet head according to claim 8, wherein the step of forming said plurality of ink chambers comprises the steps of:

forming said plurality of ink chambers using a metal mask formed on said ink chamber forming member; and plating electrically conductive members on said ink chamber forming member, thus forming said electrically conductive members, and at the same time forming, in said ink chambers, an electrically conductive layer that electrically connects said metal mask and said common electrode together.

* * * * *